United States Patent [19]

Suzuki

[11] Patent Number: 4,514,666
[45] Date of Patent: Apr. 30, 1985

[54] PULSE WIDTH MODULATION D.C. SERVO MOTOR DRIVING CIRCUIT

[75] Inventor: Hayao Suzuki, Tokyo, Japan

[73] Assignee: Seiko Instruments & Electronics Ltd., Tokyo, Japan

[21] Appl. No.: 547,879

[22] Filed: Nov. 2, 1983

[30] Foreign Application Priority Data

Nov. 9, 1982 [JP] Japan ................. 57-196206

[51] Int. Cl.³ .............................. H02P 1/22
[52] U.S. Cl. .................. 318/293; 318/257; 318/563; 318/681
[58] Field of Search ............ 318/317, 318, 329, 380, 318/599, 681, 696, 811, 293, 287, 291, 257, 563

[56] References Cited

U.S. PATENT DOCUMENTS 3,378,740  4/1968  Cruel ........................ 318/380 X
3,883,786  5/1975  McNaughton et al. ........... 318/317
3,924,168  12/1975  Woodward ..................... 318/257
4,204,143  5/1980  Coleman ..................... 318/681 X

FOREIGN PATENT DOCUMENTS 55-160983  12/1980  Japan ................. 318/293
49691      5/1981   Japan ................. 318/317
57-206283  12/1982  Japan ................. 318/293
58-26585   2/1983   Japan ................. 318/293
58-36189   3/1983   Japan ................. 318/293
2058405    4/1981   United Kingdom ........ 318/317

Primary Examiner—Stanley J. Witkowski
Assistant Examiner—Bentsu Ro
Attorney, Agent, or Firm—Robert E. Burns; Emmanuel J. Lobato; Bruce L. Adams

[57] ABSTRACT

By using the fly-wheel current effectively, the d.c. servo motor current can be rapidly decreased when the circuit becomes non-driving state or the driving polarity is changed, and the inexpensive circuit of the high performance driving circuit, in which the form factor of the driving signal is improved, can be obtained.

4 Claims, 6 Drawing Figures

PULSE WIDTH MODULATION D.C. SERVO MOTOR DRIVING CIRCUIT

BACKGROUND OF THE INVENTION

The present invention relates to a pulse width modulation d.c. servo motor driving circuit of a d.c. servo motor driving device which is used for positioning a movable member in an industrial robot or a machining apparatus or the like.

FIG. 1 shows a circuit diagram of a conventional pulse width modulation driving circuit for a d.c. servo motor and the operation of the circuit will be described in conjunction with the circuit diagram of FIG. 1, and FIGS. 2 and 3 which show waveforms in the circuit shown in FIG. 1 and the fly-wheel current.

In FIG. 1, reference numeral 1 designates a trangular wave oscillator and reference A denotes a driving command signal. Resistors 2 to 7 are used for the pulse width modulation. The values of these resistors 2 to 7 are determined in such a way that when the level of the driving command signal A is zero, the pulse width of a forward rotation driving signal B is coincident with that of a reverse rotation driving signal C at small pulse widths. In this state, a forward rotation driving current for a d.c. motor 18 provided by transistor switches 11 and 12 driven by the forward rotation driving signal B and a reverse rotation driving current provided by transistor switches 10 and 13 driven by the reverse rotation driving signal C are balanced in level to stop the operation of the d.c. servo motor 18. These values are determined in accordance with the following formula:

$$V_p/R_2 = V_M/R_5 < V_{TM}/R_4 = V_{TP}/R_7$$

wherein:

$R_2$ to $R_7$ are the resistance values of the resistors 2 to 7, respectively, $V_{TP}$ is the positive maximum value of the triangular wave oscillator 1, $V_{TM}$ is the negative maximum value thereof, $V_p$ is an output voltage of a positive voltage source and $V_M$ is an output voltage of a negative voltage source.

In general, since $V_p = V_m$ and $V_{TM} = V_{TP}$ $$V_p/R_2 < V_{TM}/R_4$$

$$R_2 = R_5$$

$$R_4 = R_7$$

Assuming that $t_{max}$ is given at the time of the maximum driving command voltage $V_A$:

$$\frac{V_A}{R_3} = \frac{V_M}{R_5} + V_{TM}\left(\frac{2}{T} t_{max} - 1\right)/R_7$$

$$R_3 = R_6$$

wherein:

T is one period of the trangular wave oscillator 1, $V_p = V_M$ and $V_{TM} = V_{TP}$.

The pulse width modulation of the forward rotation driving pulse signal B and the reverse rotation driving pulse signal C is carried out as described above, the transistor switches 10 to 13 being rendered operative, and the current corresponding to the driving command signal A being supplied to the d.c. servo motor 18.

However, in the conventional system described above, due to the inductance component of the armature of the motor and the inductance inserted in series with the motor, the system does not effectively utilize the fly-wheel current flowing through the motor. As a result, the magnitude of the ripple in the motor current is large, and the switching loss is also large. These disadvantages will be described with reference to FIG. 3 in which the equivalent circuit of the motor and the fly-wheel current are illustrated.

The driving current from a driving power source 19 flowing through the transistor switch 10, the motor 18 and the transistor switch 13 is shown by a two-dot chain line and this current is the driving current flowing through a closed loop including the transistor switches 10 and 13. When the transistor switches 10 and 13 ar turned OFF, the fly-wheel current flowing through the motor 18, a diode 15, the power source 19 and a diode 16 as shown by a one-dot chain line starts to flow. The motor 18 is shown by the corresponding equivalent circuit represented by a resistor 20, an inductance 21 and a voltage source 22. The resistor 20 represents the resistance of the armature, the inductance 21 represents the armature inductance and the voltage source 22 represents the voltage produced by the rotation of the rotor. Therefore, there are two voltage barriers in the fly-wheel current path due to the back EMF and the voltage source. The product of the current flowing by overcoming the back EMF barrier and the back EMF is changed into a mechanical energy of the motor. The product of the current flowing by overcoming the voltage source barrier and the voltage source is changed into a voltage source energy or becomes an energy loss in the voltage source. In this case, the voltage source has a higher level than the back EMF. Due to the voltage barrier in the fly-wheel current path, the fly-wheel current is rapidly decreased so that the response speed for the driving command signal is high. However, the form factor (ripple) of the motor current is lowered and thus the efficiency of the motor is also lowered. Furthermore, since the energy stored in the armature inductance of the motor is also changed into the voltage source energy or is lost, the total energy efficiency including switching loss is lowered.

SUMMARY OF THE INVENTION

The present invention intends to solve the above-described drawbacks of the prior art while keeping the high speed response of the conventional circuit.

It is an object of the present invention to provide an inexpensive high performance driving circuit in which the form factor of the driving signal is improved and the current can be rapidly decreased when the circuit assumes a non-driving state or the driving polarity is changed, which are contrary operating characteristics in a pulse width modulation driving circuit. Furthermore it is another object of the present invention to eliminate noise according to the carrier frequency.

DESCRIPTION OF THE PREFERRED EMBODIMENT

Figure 4:
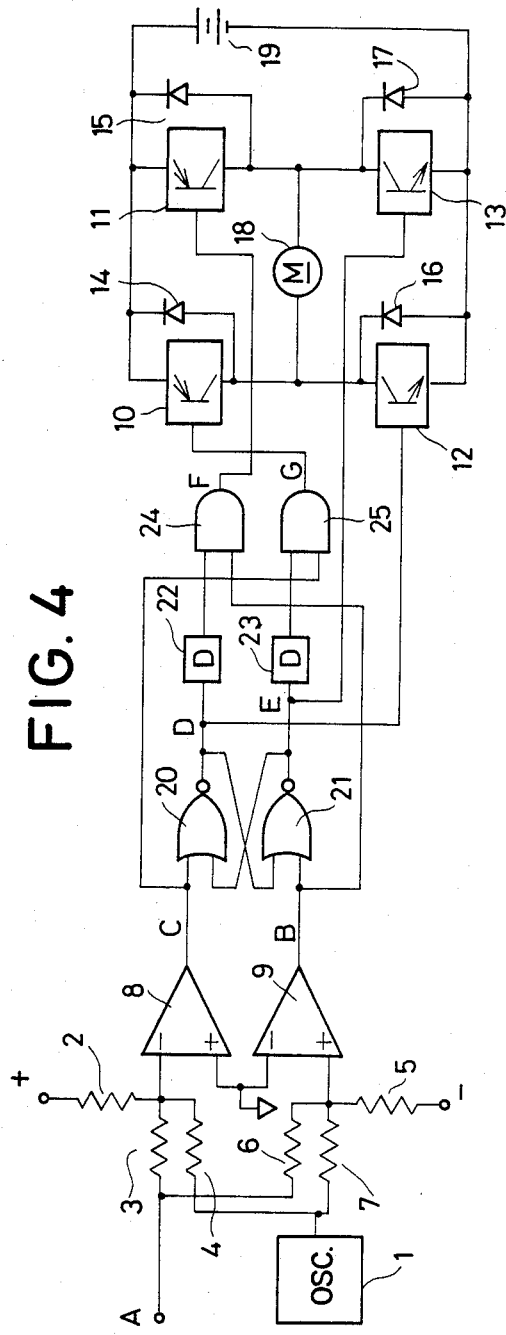
FIG. 4 is a circuit diagram of one embodiment of a pulse width modulation driving circuit of the present invention.
Figure 5:
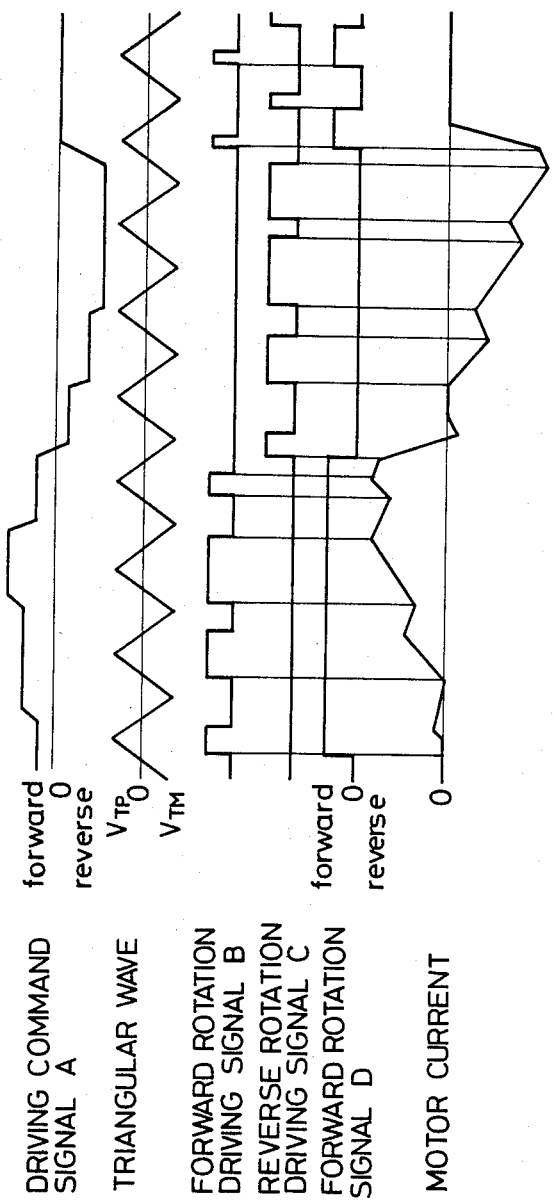
FIG. 5 is a view showing waveforms of the signals of FIG. 4.
Figure 6:
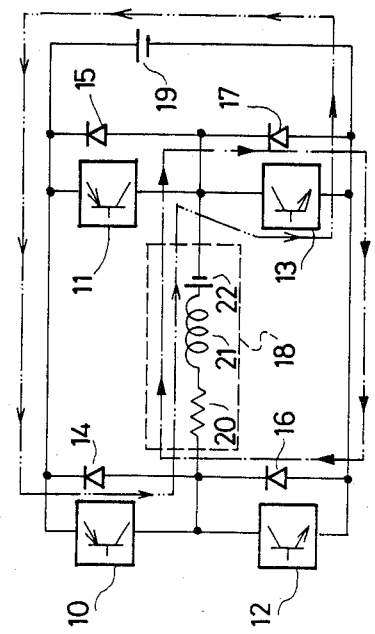
FIG. 6 is an equivalent circuit showing the fly-wheel current developed in FIG. 4.

The present invention will be described in conjunction with FIG. 4 illustrating a circuit diagram of one embodiment of the present invention, FIG. 5 showing waveforms of the signals in FIG. 4 and FIG. 6 showing the fly-wheel current in FIG. 4.

Figure 1:
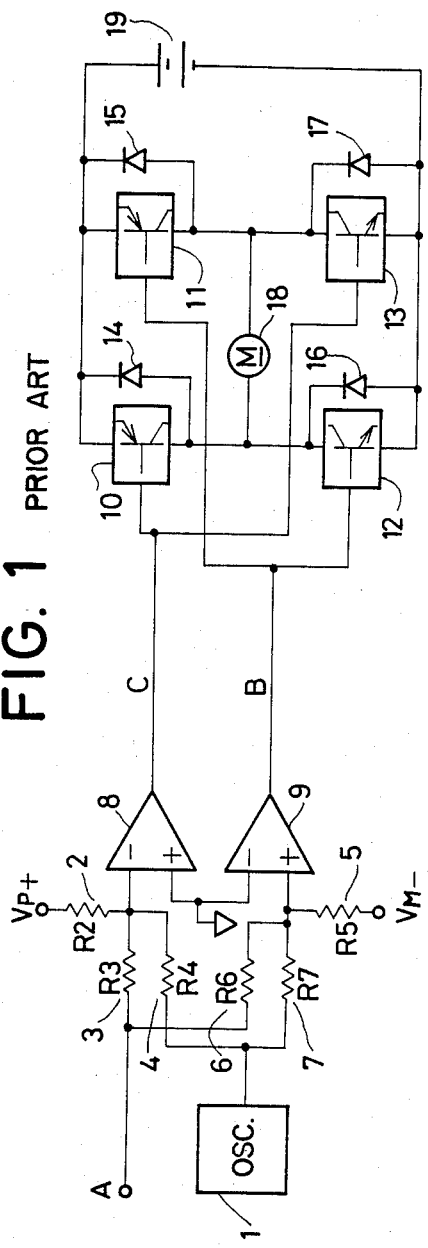
FIG. 1 is a circuit diagram of the conventional pulse width modulation driving circuit.
Figure 2:
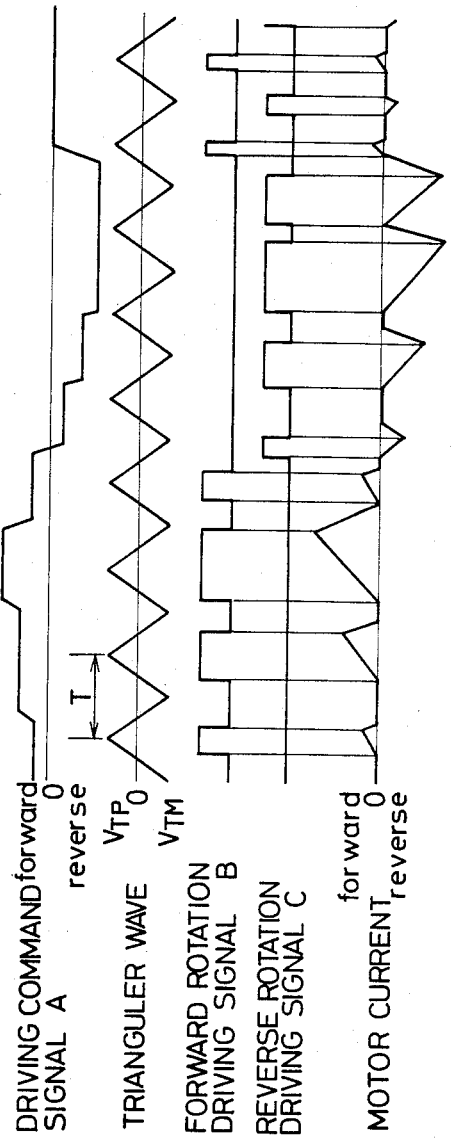
FIG. 2 is a view showing waveforms of the signals in FIG. 1.

In the circuit of FIG. 4, the forward rotation driving pulse signal B and the reverse rotation driving pulse signal C are produced in the same manner as in the conventional system of FIG. 1. There is provided a flip-flop having two NOR gates 20, 21, which are set/reset by the signals B and C, and which produce two output signals designated as a forward rotation signal D and a reverse rotation signal E.

These signals D and E are applied to the transistor switches 12 and 13 as driving signals, respectively. The signals D and E are also applied to delay circuits 22 and 23, the signal B and the time-delayed output signal corresponding to the signal D are applied to an AND gate 24 to produce a forward rotation driving pulse signal F, and the signal C and the time-delayed signal corresponding to the signal E are applied to and AND gate 25 to produce a reverse rotation driving pulse signal G. The transistor switches 11 and 10 are driven by the pulse signals F and G, respectively. These delay circuits and AND gates are provided for preventing the transistor switches from being broken (electrically breaking down), and for eliminating the noise caused by a carrier cycle current at the standstill timing, and such is accomplished by using the operation of the delay circuits 22 and 23 to eliminate the driving pulse signals B and C whose pulse widths are small enough to be eliminated in this manner. More specifically, since the driving signal is changing at the moment the directional signal is changed, due to the delay of the switching operation, it sometimes happens that the transistor switches 10 and 12 or the transistor switches 11 and 13 would close at the same time, and the delay circuits and AND gates are provided to prevent such a simultaneous closing of the switches. With this circuit arrangement, although the driving current path is the same as that of FIG. 3, the fly-wheel current flows in the current path illustrated by the one-dot chain line in FIG. 6 as long as the directional signal is not changed (e.g. the driving operation in the predetermined direction is continued). As shown in FIG. 6, only the voltage barrier caused by the back EMF exists in the current path. Therefore, as compared with the conventional circuit, the decay time of the fly-wheel current becomes longer. Furthermore, the voltage barrier is a useful component which is converted into mechanical energy of the motor, so that it assists the driving purpose and does not represent an energy loss. As a result, the form factor (ripple) can be improved as compared with the conventional circuit. This improvement is more remarkable when the back EMF is low, that is, when the rotational speed is low. Since the energy stored in the inductance of the armature is effectively used for driving the motor, the efficiency of the switching operation is improved.

Figure 3:
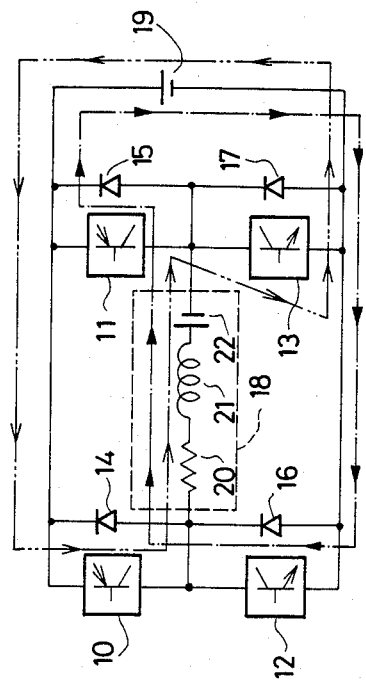
FIG. 3 is an equivalent circuit showing the fly-wheel current developed in FIG. 1.

Furthermore, although it is necessary to make the driving current decay and to provide a current with an opposite polarity when the polarity of the driving command signal A is changed, since the transistor switch 13 is turned ON at this time, the fly-wheel current flows in a manner similar to the case of FIG. 3 and the fly-wheel current is decreased rapidly. Therefore, the necessary high speed response characteristic is sufficiently maintained. In addition, the flip-flop for determining the driving polarity is formed by the use of two NOR gates as shown in FIG. 4, so that even if the forward rotation and the reverse rotation driving pulse signals B and C are applied at the same time due to an error in operation of the voltage comparator, the forward rotation and the reverse rotation signals D and E become non-active to form a fail-safe circuit. In the conventional circuit, in such a case, large current flows from the transistor switch 10 to the transistor switch 12 or from the transistor switch 11 to 13, so that it is impossible to prevent the transistor switches from being broken i.e. electrically breaking down.

As described above, according to the present invention, it is possible to construct a d.c. servo motor driving circuit in which energy efficiency is high and the form factor is excellent. Therefore, the range of application of the present invention is remarkably high.

What is claimed is:

1. In a pulse width modulation d.c. servo motor driving circuit having a triangular wave oscillator and two voltage comparators for producing a forward direction driving pulse and a reverse direction driving pulse by pulse width modulation according to the driving direction and driving intensity in response to an analog driving command signal whose level varies with the passage of time, the forward direction driving pulse and the reverse direction driving pulse being alternately output when the analog driving command signal is zero, to operate the motor in forward and reverse directions by switching a transistor bridge circuit in accordance with the modulated pulse signals: a flip-flop circuit connected to be reset/set in response to the forward direction driving pulse or the reverse direction driving pulse, two delay circuits connected to the flip-flop circuit for providing a delay time to the forward and reverse direction driving pulses which are output from the flip-flop circuit, the time delay being longer than the pulse width of the forward and reverse direction driving pulses during the time the analog driving command signal is zero, a first AND circuit for carrying out an AND operation between the forward direction driving pulse and the time-delayed forward direction signal output from one of the delay circuits, a second AND circuit for carrying out an AND operation between the reverse direction driving pulse and the time-delayed reverse direction signal output from the other of the delay circuits, means for applying the forward and reverse direction driving pulses to a first set of transistor switches of the transistor bridge circuit which are connected to one terminal of a driving power source for driving the first transistor switches, and means for applying the output signals from the first and second AND circuits to a second set of transistor switches of the transistor bridge circuit which are connected to the other terminal of the driving power source for driving the second transistor switches.

2. A pulse width modulation d.c. servo motor driving circuit as claimed in claim 1, wherein the flip-flop circuit comprises two NOR gates.

3. In a pulse width modulation d.c. servo motor driving circuit of the type having a transistor bridge circuit comprised of two forward direction switching transistors and two reverse direction switching transistors for controlling the application of pulse width modulated forward and reverse rotation driving pulses to a d.c. servo motor in accordance with an analog driving command signal and operative when the analog driving command signal is zero to alternately apply forward and reverse rotation driving pulses of a predetermined pulse width to the motor; flip-flop circuit means connected to receive the forward and reverse rotation driving pulses and connected to be reset and set in response thereto; delay circuit means connected to receive the forward and reverse rotation driving pulses output from the flip-flop circuit means for time delaying the forward and reverse rotation driving pulses by a delay time longer than the predetermined pulse width of the forward and reverse rotation driving pulses which exists when the analog driving command signal is zero and producing corresponding time-delayed forward and reverse rotation driving pulses; a first AND circuit connected to receive the forward rotation driving pulses and the time-delayed forward rotation driving pulses for gating therethrough the forward rotation driving pulses; a second AND circuit connected to receive the reverse rotation driving pulses and the time-delayed reverse rotation driving pulses for gating therethrough the reverse rotation driving pulses; means for applying the forward rotation driving pulses output from the flip-flop circuit means to one of the forward direction switching transistors and for applying the gated forward rotation driving pulses to the other of the forward direction switching transistors to control the forward rotation of the motor; and means for applying the reverse rotation driving pulses output from the flip-flop circuit means to one of the reverse direction switching transistors and for applying the gated reverse rotation driving pulses to the other of the reverse direction switching transistors to control the reverse rotation of the motor.

4. A pulse width modulation d.c. servo motor driving circuit according to claim 3; wherein the flip-flop circuit means comprises two NOR gates.

* * * * *